United States Patent [19]

Padget

[11] 4,358,402

[45] Nov. 9, 1982

[54] CHLORINATED POLYMERS

[75] Inventor: John C. Padget, Runcorn, England

[73] Assignee: Imperial Chemical Industries Limited, London, England

[21] Appl. No.: 737,273

[22] Filed: Nov. 1, 1976

[30] Foreign Application Priority Data

Nov. 27, 1975 [GB] United Kingdom ............... 48782/75
Jul. 27, 1976 [GB] United Kingdom ............... 31238/76
Aug. 27, 1976 [GB] United Kingdom ............... 35735/76

[51] Int. Cl.$^3$ ............................................. C08L 15/02
[52] U.S. Cl. .................................... 525/192; 525/192; 525/198; 525/215; 525/236; 525/239; 525/240; 525/241; 526/237
[58] Field of Search .................... 260/3.5, 5, 887, 890, 260/894, 772, 33.8 UA; 525/192, 198, 215, 236, 239, 240, 241

[56] References Cited

U.S. PATENT DOCUMENTS

| | | | |
|---|---|---|---|
| 2,334,277 | 11/1943 | Morrell et al. | 260/772 |
| 2,581,920 | 1/1952 | Kuhn | 260/890 |
| 2,943,988 | 5/1960 | Canterino | 204/163 |
| 3,326,833 | 6/1967 | Raley | 260/890 |

FOREIGN PATENT DOCUMENTS

| | | | |
|---|---|---|---|
| 2359461 | 11/1973 | Fed. Rep. of Germany | 260/890 |
| 487167 | 6/1938 | United Kingdom . | |
| 986995 | 3/1965 | United Kingdom | 260/890 |
| 1082478 | 6/1967 | United Kingdom . | |
| 1229343 | 4/1971 | United Kingdom | 260/890 |

*Primary Examiner*—J. Ziegler
*Attorney, Agent, or Firm*—Cushman, Darby & Cushman

[57] ABSTRACT

A solid chlorinated polymer product having reduced residual solvent content is prepared by treatment of a solution thereof with steam or hot water in the presence of a separately prepared added chlorinated polymer having a second-order transition temperature at least 20° below that of the chlorinated polymer product which would be obtained in the absence of the added chlorinated polymer.

14 Claims, No Drawings

CHLORINATED POLYMERS

This invention relates to the production of chlorinated polymers.

The term "polymer" as used herein includes copolymers.

A process commonly employed for the chlorination of aliphatic polymers (for example natural rubber, polybutadiene, polyisoprene, polyethylene, polypropylene and ethylene/propylene copolymers) comprises introducing gaseous chlorine into a solution of the polymer in a chlorine-resistant organic solvent at an elevated temperature (for example at a temperature in the range 60° C. to 120° C.).

The chlorine-resistant solvents commonly employed in this process are chlorinated hydrocarbons, and include not only those solvents which are inert towards chlorine but also others which may react to some degree with chlorine under the conditions employed but, in so reacting, are converted to chlorinated solvents which are substantially inert towards chlorine. Examples include carbon tetrachloride, chloroform, methylene chloride, trichloroethylene, tetrachloroethane and mixtures thereof.

The chlorinated polymer produced may conveniently be isolated in solid form by treatment of the reaction mixture with steam or hot water, thereby distilling off most of the organic solvent employed in the chlorination reaction.

The solid chlorinated polymers thus obtained may be dried by conventional means but, even after the drying stage, often retain an appreciable proportion of the organic solvent in the product (for example up to 10 parts by weight of organic solvent per hundred parts by weight of the chlorinated polymer). The residual organic solvent is difficult to remove by further drying or direct distillation, but vapours of the organic solvent retained in the product may in some circumstances be evolved during subsequent use of the chlorinated polymer, for example during the formulation or use of a paint containing the chlorinated polymer. Such evolution of the organic solvent is generally undesirable, in view of the toxicity of the solvents commonly employed in the chlorination process.

It has been proposed (German OLS No. 2 359 461) to reduce the proportion of organic solvent in the final product by adding to the chlorination solution, before steam distillation, 2 to 14% by weight (based on the chlorinated polymer) of a conventional platiciser and/or a lacquer resin.

The presence of appreciable proportions of such additives, may, however, be undesirable or unacceptable in particular formulations and commercial applications of the chlorinated polymers.

According to the present invention there is provided a process for the preparation of a chlorinated polymer product wherein a solution produced by chlorination of an aliphatic polymer in a chlorine-resistant solvent is treated with steam or hot water, thereby separating a chlorinated polymer product in solid form, the treatment with steam or hot water being carried out in the presence of a minor proportion by weight (based on the total weight of chlorinated polymers in the solution) of a separately prepared added chlorinated polymer which has a second-order transition temperature at least 20° C. below that of the chlorinated polymer product which would be obtained in the absence thereof and which is compatible with the said product in the proportions employed.

The process of the present invention leads to a solid chlorinated polymer product having a lower proportion of residual solvent than the corresponding product which would be obtained in the absence of the added chlorinated polymer.

The solution treated will usually be the direct product of the chlorination of one or more aliphatic polymers in the chlorine-resistant solvent. Thus according to another aspect of the present invention there is provided a process for the preparation of a chlorinated polymer product comprising the steps of (i) chlorination of one or more aliphatic polymers in a chlorine-resistant solvent at elevated temperature and (ii) treatment of the solution thus obtained with steam or hot water, thereby separating a chlorinated polymer product in solid form, the said treatment being carried out as defined in the preceding paragraph.

The added chlorinated polymer may be added prior to or during (most conveniently prior to) the treatment with steam or hot water.

The polymers which may be used as starting materials in the chlorination process include those aliphatic hydrocarbon polymers mentioned hereinbefore in relation to the known process, for example natural rubber, polybutadiene, polyisoprene, polyethylene, polypropylene, ethylene-propylene copolymers, and mixtures thereof.

Other polymers which may be used as starting materials in the chlorination process include poly(halohydrocarbon)s, for example poly(chloroprene) and poly(vinyl chloride) and partially chlorinated aliphatic polymers.

The term "aliphatic polymer" includes polymers containing units derived from one or more aliphatic monomers and also containing units derived from an aromatic compound, for example (i) the polymers or copolymers of butadiene and isoprene containing toluene in condensed form as described in the specification of United Kingdom Pat. No. 1,082,478 and (ii) telomers derived from a conjugated diene or vinylidene-substituted as taxogen and from an aromatic compound (for example toluene) as telogen, as described in the specification of United Kingdom Pat. No. 1,288,057.

Suitable chlorine-resistant organic solvents, suitable conditions and techniques for the chlorination, and suitable techniques for separating the solid chlorinated polymers by precipitation with steam or hot water may be any of those known in the art.

The added chlorinated polymer may be derived by chlorinating, for example, a hydrocarbon polymer, for example natural rubber, polybutadiene, polyisoprene, polyethylene, polypropylene, ethylene/propylene copolymers, and mixtures thereof, or by chlorinating a poly(halohydrocarbon), for example poly (chloroprene). The added chlorinated polymer may also be derived by chlorinating a polymer containing units which are chlorinatable and units which are not chlorinatable under the chlorination conditions used. A suitable polymer of this type is a copolymer containing units derived from styrene, or a copolymerisable derivative thereof, e.g. alpha-methyl styrene, and units derived from a conjugated diolefin, e.g. butadiene or isoprene. Preferred copolymers of this type are a styrene-butadiene copolymer and an alphamethyl styrene/butadiene copolymer.

In general, the lower the second-order transition temperature of the added chlorinated polymer the lower is the proportion of the added chlorinated polymer which is needed to produce a given reduction in the amount of residual solvent in the solid chlorinated polymer product. Thus, where the difference in the second-order transition temperature of the respective polymers is only slightly greater than the required minimum difference of at least 20° C. then a relatively large proportion of the added chlorinated polymer will be required in order to produce a substantial reduction in the amount of residual solvent in the solid chlorinated polymer product.

In order that the proportion of added chlorinated polymer should not be too great it is preferred that the second-order transition temperature of the added chlorinated polymer be at least 50° C. below that of the chlorinated polymer product which would be obtained in the absence thereof.

The second-order transition temperature of the added chlorinated polymer, in addition to being at least 20° C. below that of the chlorinated polymer product which would be obtained in the absence thereof, is preferably below 0° C.; it is especially preferred that the second-order transition temperature is below minus 10° C., for example minus 30° C. or below.

The lower limit of the chlorine content of the added chlorinated polymer will usually be determined in practice by the requirement of compatibility between the added chlorinated polymer and the chlorinated polymer which would be obtained in the absence thereof. The upper limit of the chlorine content of the added chlorinated polymer will be determined by the effect of the chlorine content on the second-order transition temperature of the polymer.

The proportion of the added chlorinated polymer is preferably at least 1 part (for example from 5 to 20 parts) by weight per hundred parts by weight of the other chlorinated polymers in the system. Higher proportions may, however, be used especially where there is only a small difference between the second-order transition temperature of the chlorinated polymers concerned; thus in some cases there may be used proportions of 50 parts or more of the added chlorinated polymer per hundred parts of the other chlorinated polymers in the system. The upper limit may be set in practice by such factors as the compatibility between the chlorinated polymers concerned and the proportion of added chlorinated polymer which is acceptable for the particular formulation or commercial application in which the solid chlorinated polymer product is to be used.

The minimum chlorine content required in the added chlorinated polymer in order to achieve compatibility will depend (a) upon the other chlorinated products in the system, (b) upon the chemical composition and molecular weight of the added chlorinated polymer and (c) upon the proportion of the added chlorinated polymer employed. In general, in order to achieve compatability, the chlorine content of the added chlorinated polymer is preferably more than 20% by weight but in some cases the minimum chlorine content may be, for example, 30% by weight or even higher.

The invention is illustrated by the following Examples in which all parts and percentages are by weight unless otherwise stated. Second-order transition temperatures were measured using differential scanning calorimetry.

EXAMPLE 1

A solution was prepared of 89.5 parts of degraded cis 1,4-polyisoprene in 1000 parts of carbon tetrachloride. Gaseous chlorine was passed into this solution at 68° C. until the chlorine content of the polymer was 66% by weight. Excess chlorine was removed from the solution by purging with nitrogen.

A portion of this solution containing 100 parts of chlorinated polyisoprene in 380 parts of carbon tetrachloride was taken and 10 parts of chlorinated polybutadiene were added, followed by stirring at 68° C. for 1 hour to effect dissolution of the chlorinated polybutadiene. (The chlorinated butadiene which was compatible with the chlorinated polyisoprene in these proportions contained 28% by weight of chlorine and had a second-order transition temperature of minus 30° C.; it had been prepared by chlorination of polybutadiene having a number average molecular weight of 800 and containing 47% trans 1,4; 15% cis 1,4 and 38% vinyl unsaturation.)

The chlorinated polymer product was then precipitated by injection of the solution into hot water (95° C.), and the precipitated polymer was dried at 70° C. for 48 hours in an oven providing a through flow of air. The carbon tetrachloride content of the dried product was 1.5% by weight.

For purposes of comparison the same procedure was followed except that there was no addition of the chlorinated polybutadiene. The carbon tetrachloride content of the dried chlorinated polyisoprene was 6.9% by weight. The second-order transition temperature of the chlorinated polyisoprene was 130° C. (This was measured using a sample of the chlorinated polyisoprene containing little or no carbon tetrachloride which had been prepared by precipitation with methanol, washing with methanol and drying.)

EXAMPLE 2

A solution was prepared by dissolving 89.5 parts of degraded cis-1,4-polyisoprene in 1000 parts of carbon tetrachloride. Gaseous chlorine was passed into this solution at 68° C. until the chlorine content of the polymer was 66%. Excess chlorine was removed from the solution by purging the solution with nitrogen.

A portion of the solution prepared as described above and containing 100 parts of chlorinated polyisoprene in 380 parts of carbon tetrachloride was mixed with a solution of 95 parts of a chlorinated butadiene/α-methyl styrene copolymer in 380 parts of carbon tetrachloride. The solutions were thoroughly mixed by stirring for 15 minutes at ambient temperature. (The chlorinated butadiene/α-methyl styrene copolymer, which was compatible with the chlorinated polyisoprene in these proportions and had a second-order transition temperature of 93° C., had been prepared by chlorinating a butadieneα-methyl styrene copolymer having a number average molecular weight of 2370 and containing 90% of butadiene and 10% of α-methyl styrene. The chlorinated copolymer had a chlorine content of 56%).

The chlorinated polymers in the mixed solutions were then precipitated by injecting the mixed solutions into hot water (95° C.) and the precipitated polymer was dried by heating at 93° C. for 24 hours in an oven through which air was circulated. The carbon tetrachloride content of the dried polymers was 1.2%.

For the purpose of comparison the procedure described above was followed except that the chlorinated butadiene/α-methyl styrene copolymer was omitted. The carbon tetrachloride content of the resultant dried chlorinated polyisoprene was 7.0%. The second-order transition temperature of the chlorinated polyisoprene, was 130° C. measured as described in Example 1. Examples 3 to 5 show the relationship between chlorine content and compatibility in the case of certain chlorinated polybutadienes when used as the "second chlorinated polymer" incorporated with a chlorinated polyisoprene.

Compatibility (in these Examples and in the preceding Examples) was assessed by dissolving the mixture of chlorinated polymers in a solvent (consisting of 4 parts of "Solvesso 100" and 1 part of white spirits), casting the mixture from solution on to a glass plate and allowing the solvent to evaporate. Phase separation was assessed by visual inspection of the film so formed; a cloudy or hazy film indicated incompatibility while a clear transparent film indicated compatibility between the chlorinated polymers.

EXAMPLE 3

A solution was prepared by dissolving 89.5 parts of degraded cis-1,4 -polyisoprene in 100 parts of carbon tetrachloride. Gaseous chlorine was passed into this solution at 68° C. until the chlorine content of the polymer was 66%. Excess chlorine was removed from the solution by purging the solution with nitrogen.

A portion of the solution prepared as described above and containing 100 parts of chlorinated polyisoprene in 330 parts of carbon tetrachloride was mixed with a solution of 10 parts of a chlorinated polybutadiene in 380 parts of carbon tetrachloride. The solutions were thoroughly mixed by stirring for 15 minutes at ambient temperature. (The chlorinated polybutadiene, which had a second-order transition temperature of minus 40° C. measured by differential scanning calorimetry, had been prepared by chlorinating a polybutadiene having a number average molecular weight of 800 and containing 47% trans 1,4, 14% cis 1,4 and 30% vinyl unsaturation. The chlorinated polybutadiene had a chlorine content of 23.7%)

The chlorinated polymers in the mixed solutions were then precipitated by injecting the mixed solutions into hot water (95° C.) and the precipitated polymer was dried by heating at 70° C. for 24 hours in an oven through which air was circulated. The carbon tetrachloride content of the dried chlorinated polymers was 2.9% and the chlorinated polymers were compatible in the proportions employed.

For the purposes of comparison the above procedure was followed except that there was no addition of chlorinated polybutadiene prior to the treatment with hot water. The carbon tetrachloride content of the chlorinated polyisoprene was 6.9%. The chlorinated polyisoprene had a second-order transition temperature of 130° C., as measured by differential scanning calorimetry on sample of the chlorinated polyisoprene containing little or no residual carbon tetrachloride which had been prepared by adding a portion of the above solution to methanol and isolating, washing (with methanol), and drying the precipated chlorinated polyisoprene.

Again by way of comparison the same procedure was followed except the chlorinated polybutadiene had a chlorine content of 19.5% (and a second-order transition temperature of minus 49° C.).

The carbon tetrachloride content of the dried chlorinated polymers was 2.8% but the mixture was incompatible.

EXAMPLE 4

The procedure of Example 3 was repeated except that the chlorinated polybutadiene used as the added chlorinated polymer had been prepared by chlorinating a polybutadiene having a number average molecular weight of 970 (and containing approximately 51% trans 1,4;19% cis 1,4 and 30% vinyl unsaturation) and that the drying was carried out at 93° for 24 hours.

A series of experiments was carried out varying the chlorine content of the chlorinated polybutadiene (using 10 grams of the chlorinated polybutadiene in each case) and it was found that the minimum chlorine content required in the chlorinated polybutadiene in order to achieve compatibility in the proportions employed was 31% (second-order transition temperature minus 20° C.), in which case the carbon tetrachloride content of the dried chlorinated polymers was 0.7%.

EXAMPLE 5

The procedure of Example 3 was repeated except that the chlorinated polybutadiene used as the added chlorinated polymer had been prepared by chlorinating a polybutadiene having a number average molecular weight of 1260 (and containing approximately 37% trans 1,4 15% cis 1,4 and 48% vinyl unsaturation) and that the drying was carried out at 93° C. for 24 hours.

A series of experiments was carried out varying the chlorine content of the chlorinated polybutadiene (using 10 grams of the chlorinated polybutadiene in each case) and it was found that the minimum chlorine content required in the chlorinated polybutadiene in order to achieve compatibility in the proportions employed was 39% (second-order transition temperature 0° C.) in which case the carbon tetrachloride content of the dried chlorinated polymers was 1.5%.

EXAMPLE 6

A solution was prepared of 89.5 parts of degraded natural rubber in 1000 parts of carbon tetrachloride. Gaseous chlorine was passed into this solution at 68° C. until the chlorine content of the chlorinated rubber was 66.5%.

A portion of this solution, containing 100 parts of chlorinated rubber in 380 parts of carbon tetrachloride, was taken and 10 parts of chlorinated polybutadiene were added, followed by stirring to effect dissolution of the chlorinated polybutadiene. (The chlorinated polybutadiene, which was compatible with the chlorinated rubber in the proportions employed, contained 31% of chlorine and had a second-order transition temperature of minus 25° C.; it had been prepared by chlorination of polybutadiene having a number average molecular weight of 920 and containing 57% trans 1,4; 18% cis 1,4 and 25% vinyl unsaturation).

The chlorinated polymer product was then precipitated by injection of the solution into hot water (95° C.) and the precipitated product was dried at 85° C. for 24 hours. The carbon tetrachloride content of the dried product was 0.4 by weight.

By way of comparison the same procedure was followed except that there was no addition of the chlorinated polybutadiene. The carbon tetrachloride content of the dried product was 4.6 by weight. The second-order transition temperature of the chlorinated rubber was 136° C. (measured using a sample prepared by precipitation with methanol).

EXAMPLE 7

A solution was prepared of 89.5 parts of polybutadiene in 1000 parts of carbon tetrachloride. The polybutadiene contained 41% trans 1,4; 38% cis 1,4 and 21% vinyl unsaturation. Gaseous chlorine was passed into this solution at 68° C. until the chlorine content of the chlorinated polybutadiene was 65%.

A portion of this solution, containing 100 parts of the chlorinated polybutadiene in 380 parts of carbon tetrachloride was taken and to this were added 10 parts of a separately prepared chlorinated polybutadiene containing 31% of chlorine, (the same chlorinated polybutadiene as described in Example 6). The two chlorinated polybutadienes were compatible in the proportions employed.

The product was precipitated with hot water and dried using the procedure described in Example 6. The carbon tetrachloride content of the dried product was 0.2% by weight.

By way of comparison the same procedure was followed except that there was no addition of the separately prepared chlorinated polybutadiene. The carbon tetrachloride content of the dried product was 1.75% by weight; the second-order transition temperature was 143° C. (measured using a sample prepared by precipitation with methanol).

What is claimed is:

1. In a process for the preparation of a chlorinated polymer product, wherein a solution obtained by chlorination of an aliphatic polymer in a chlorine-resistant solvent is treated with steam or hot water, thereby separating a chlorinated polymer product in solid form, the improvement which comprises carrying out the treatment with steam or hot water in the presence in the said solution of a minor proportion by weight, based on the total weight of chlorinated polymers in the solution, of a separately prepared added chlorinated polymer which has a second-order transition temperature at least 20° C. below that of the chlorinated polymer product which would be obtained in the absence thereof and which is compatible with the said product in the proportions employed, said added chlorinated polymer having a chlorine content of at least 30% by weight.

2. A process according to claim 1 wherein the added chlorinated polymer has a second-order transition temperature at least 50° C. below that of the chlorinated polymer product which would be obtained in the absence thereof.

3. A process according to claim 1 wherein the added chlorinated polymer has a second-order transition temperature below 0° C.

4. A process according to claim 1 wherein the proportion of the added chlorinated polymer is at least 1 part by weight per hundred total parts by weight of the other chlorinated polymers in the solution.

5. A process according to claim 4 wherein the proportion of the added chlorinated polymer is from 5 to 20 parts by weight per hundred total parts by weight of the other chlorinated polymers in the solution.

6. A process according to claim 1 wherein the solution treated comprises one or more chlorinated polymers prepared by chlorination of an aliphatic hydrocarbon polymer.

7. A process according to claim 6 wherein the aliphatic hydrocarbon polymer is selected from the group consisting of natural rubber, polybutadiene and polyisoprene.

8. A process according to claim 1 wherein the added chlorinated polymer is prepared by chlorination of an aliphatic hydrocarbon polymer.

9. A process according to claim 8 wherein the added chlorinated polymer is prepared by chlorination of polybutadiene.

10. A process according to claim 1 wherein the added chlorinated polymer is prepared by chlorination of a copolymer containing units which are chlorinatable and units which are not chlorinatable under the chlorination conditions used.

11. A process according to claim 10 wherein the added chlorinated polymer is prepared by chlorination of a copolymer derived from (a) styrene, or a copolymerisable derivative thereof and (b) a conjugated diolefin.

12. A process according to claim 11 wherein the added chlorinated polymer is prepared by chlorination of a copolymer of butadiene with styrene or alpha-methyl styrene.

13. A process according to claim 1 wherein the chlorine-resistant solvent is a chlorinated hydrocarbon.

14. A process according to claim 13 wherein the chlorinated hydrocarbon is carbon tetrachloride.

* * * * *